United States Patent [19]
Beller

[11] 3,918,658
[45] Nov. 11, 1975

[54] SEAT BELT RETRACTOR HAVING INERTIAL DEVICE ACTIVATED BY TWO STIMULI

[75] Inventor: Herbert R. Beller, Mount Clemens, Mich.

[73] Assignee: N. V. Klippan S.A., Haasrode, Belgium

[22] Filed: June 15, 1973
(Under Rule 47)

[21] Appl. No.: 370,567

[52] U.S. Cl. .................. 242/107.4; 280/150 SB
[51] Int. Cl.² ................................. A62B 35/02
[58] Field of Search ........ 242/107.4, 107.2, 107 SB; 280/150 SB; 244/122

[56] References Cited
UNITED STATES PATENTS

| | | | |
|---|---|---|---|
| 3,430,891 | 3/1969 | Burleigh | 242/107.4 |
| 3,446,454 | 5/1969 | Kovacs et al. | 242/107.4 |
| 3,508,720 | 4/1970 | Kell | 242/107.4 |
| 3,598,336 | 8/1971 | Frost | 242/107.4 |
| 3,632,056 | 1/1972 | Hibbard | 242/107.4 |
| 3,711,037 | 1/1973 | Jakob | 242/107.4 |
| 3,741,496 | 6/1973 | Beller | 242/107.4 |
| 3,797,603 | 3/1974 | Loomba | 242/107.4 X |
| 3,802,642 | 4/1974 | Klink | 242/107.4 |

Primary Examiner—Billy S. Taylor
Attorney, Agent, or Firm—Jonathan Plaut; John P. Kirby, Jr.

[57] ABSTRACT

A reel-type retractor for a safety belt incorporating a single inertial locking system responsive to two different stimuli for actuating a pawl to locking engagement with a ratchet wheel. A pendulum responds to a first stimulus resulting from acceleration, deceleration or roll-over of the vehicle. An inertia wheel responds to a second stimulus resulting from acceleration in withdrawal of the safety belt. The retractor includes: a movable plate; a driving gear fixed to the end of a reel shaft extending adjacent to the outside surface of the movable plate; and a driven gear fixed to a spindle mounted on the movable plate. The driven gear meshes with the driving gear. When accelerated rotation of the reel shaft and driving gear exceeds a predetermined rate, the driven gear moves around the driving gear, causing movement of the plate, which urges the pawl into locking engagement with the ratchet wheel. A lever is mounted above the pendulum. The pendulum is adapted to move the lever into contact with the inertia wheel, thereby inhibiting rotation of the inertia wheel. Thus, the pendulum does not directly affect the pawl, but rather places the inertia wheel in a condition wherein any pull on the safety belt causes the pawl to engage the ratchet instantly.

16 Claims, 3 Drawing Figures

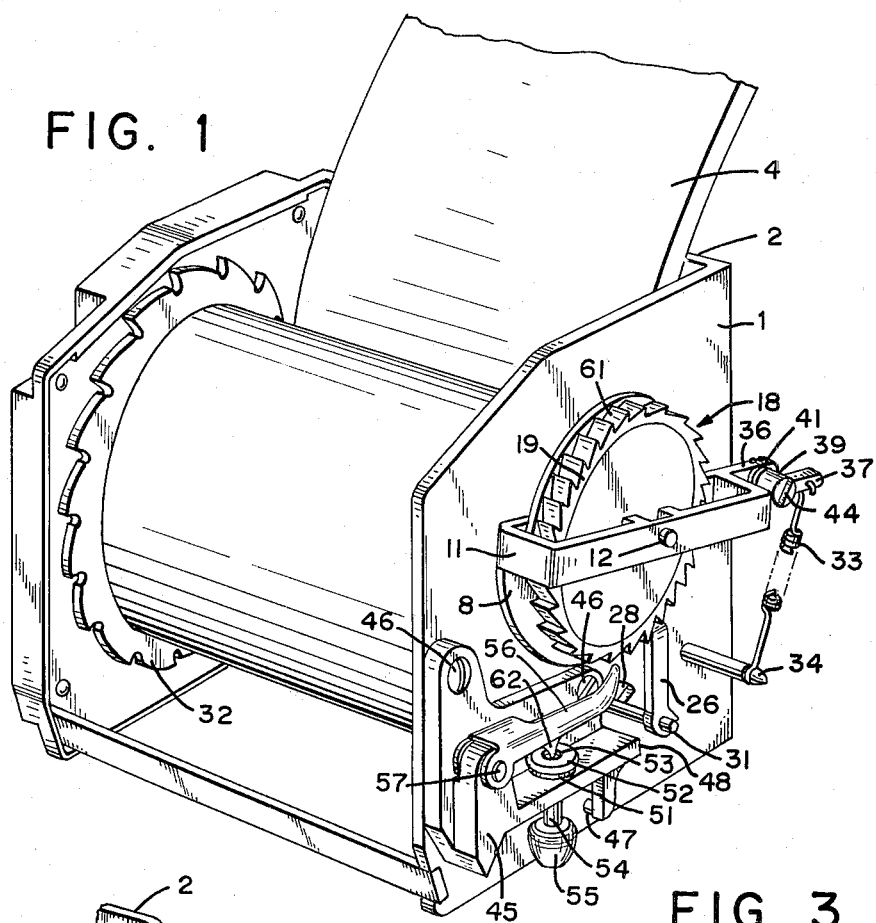
FIG. 1
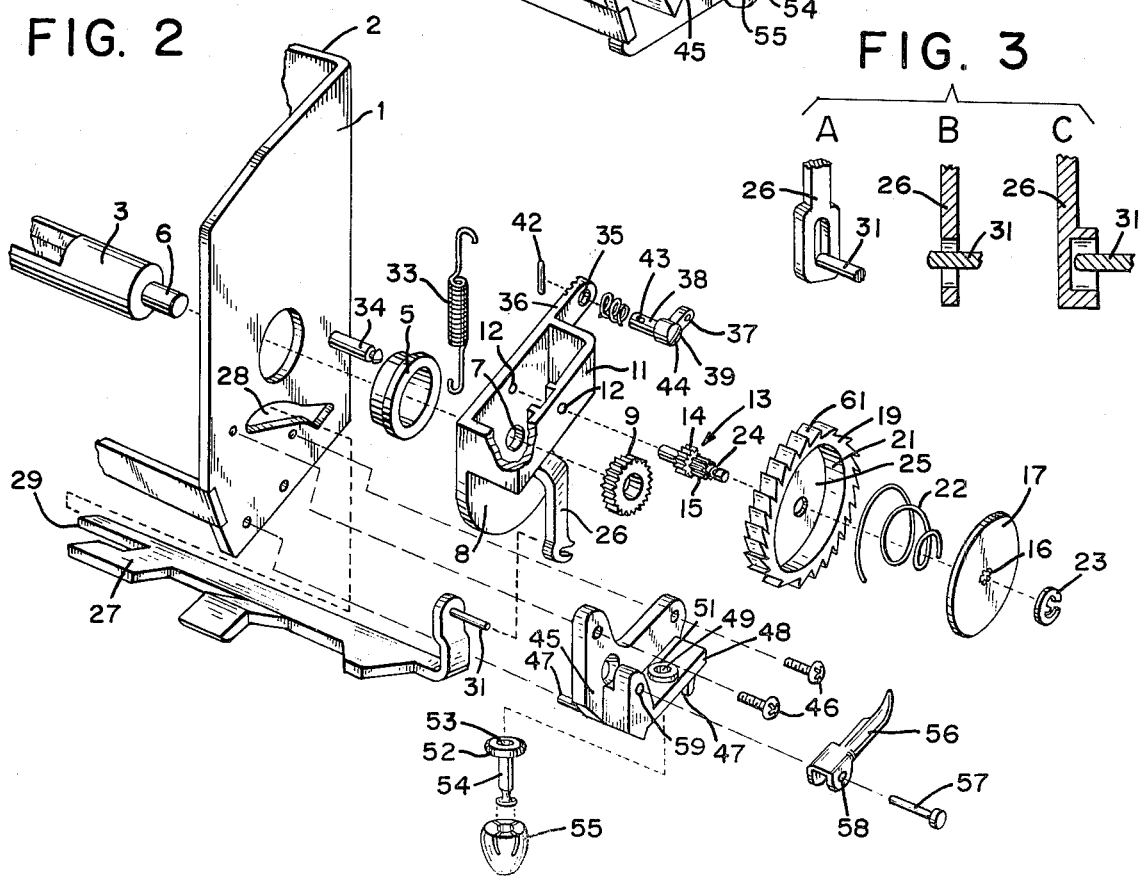
FIG. 2
FIG. 3

SEAT BELT RETRACTOR HAVING INERTIAL DEVICE ACTIVATED BY TWO STIMULI

BACKGROUND OF THE INVENTION

1. FIELD OF THE INVENTION

This invention relates to vehicle safety seat belt retractors, and more particularly to those retractors which are normally unlocked when the belt is extended and buckled about the user but automatically lock in response to the forces which develop during the moment of impact, should a collision occur.

2. DESCRIPTION OF THE PRIOR ART

Emergency-locking seat belt retractors usually have a reel, biased in the rewind direction, to which a seat belt is attached for retraction. In these retractors of the prior art the reel is normally unlocked under ordinary driving conditions even though the belt is buckled about the user, thus paying out more belt or taking up the slack, in accordance with normal movements of the individual. A locking device is provided, responsive to the forces which develop at the moment of impact, thus preventing further extension of the belt and retaining the user in his or her seat.

The state of the art in this type of retraction device is exemplified by reference to U.S. Pat. Nos. 2,845,233; 3,412,952; 3,446,454; 3,467,337; 3,482,799; 3,598,336; 3,632,056; 3,741,496, and 3,838,831.

SUMMARY OF THE INVENTION

An automatic seat belt retracting device is disclosed having a pawl, normally out of locking engagement with a ratchet wheel fixed to a shaft on which a seat belt is wound, the shaft being biased in the rewind direction. When the pawl engages the ratchet wheel, pay-out or extension of the seat belt webbing is prevented. The incorporation of one inertial device responsive to two different but related stimuli is disclosed, which under emergency conditions urges the pawl into engagement with the ratchet wheel. This dual response is particularly important, first because the forces or conditions which develop at the time of an accident vary in nature. Having an inertial device responsive to two different stimuli increases the range of sensitivity of the retractor. For example, a car can veer off the highway, go over an embankment and roll over, without the usual accelerated extension of the belt characteristic of a collision, yet activation of the retractor in such a situation can reduce the danger of injury or loss of life. The response of the inertial device of the seat belt retractor of the present invention to acceleration, deceleration or roll-over of the vehicle to which the retractor is attached constitutes response to the first stimulus. Such response is provided by a pendulum having freedom to swing in any direction. Deceleration, of course, results from braking or collision, whereas acceleration of a degree to constitute an emergency will result from the vehicle being struck from the rear or sides. It also will occur when the vehicle is struck in front when stationary, or when a collision with another moving vehicle is sufficiently severe as to reverse or change direction of the vehicle under consideration.

The retractor of the present invention incorporates a pawl which is spring-biased to the unlocked position and does not depend on a spring to urge the pawl into locking engagement with the ratchet wheel. It might be assumed therefore, that since the pawl is biased to the unlocked position, considerable force would have to be applied by an inertial device, such as a pendulum, to overcome the bias of the pawl and urge it into locking engagement with the ratchet wheel. This assumption would have no basis in the case of the present embodiment, for it is a novel feature of this invention that the free swinging pendulum constituting one sensor of the inertial unit does not have a direct effect on the pawl, but rather places the inertial device in a condition wherein any pull on the safety belt, causes the pawl to instantly engage the ratchet. In other words, it is not the relatively weak force of the pendulum that activates the pawl, but the far greater force applied to the belt by the body-movement of the wearer. It is important to note that motion of the belt to cause the pawl to engage the ratchet wheel when the pendulum has responded to acceleration, deceleration or tilt of the vehicle, need not be an accelerating motion. Any motion of the belt in the pay-out direction however uniform or slight, serves to lock the retractor against further extension of the belt, with the proviso that the pendulum has first responded to stimulus. Since the pendulum sensor can be made as sensitive or insensitive as desired, this novel arrangement provides a very positive and reliable restraint, for in effect, it is the restraining force which provides the feed-back to lock the pawl. This is true, for the initial restraint is provided by a lever engaging a ratchet on the periphery of an inertial wheel as will be made clear and this initial restraint because of the action of a friction clutch is immediately relayed to, and taken over by, the heavy duty pawl and ratchet wheel.

The response of the inertial webbing-sensitive locking mechanism or device of the seat belt retractor of the present invention, to withdrawal of the safety belt webbing at a pre-selected high rate of acceleration, as would be caused by the sudden forward lurch of a person wearing the belt in a vehicle involved in a collision, constitutes response to the second stimulus. Such response is provided by an inertial wheel which is another component of the inertial mechanism. The inertia of the wheel to sudden rotation, when driven by its geared connection to the shaft on which the seat belt webbing is wound, develops the alternate force which urges the pawl into locking engagement with the ratchet wheel. This force develops, because the inertial wheel which is frictionally attached and concentric to a driven pinion gear, is mounted for rotation on a movable plate rotatable about the shaft on which the webbing is wound. The plate carries an arm which engages an extending projection of the pawl. The plate, which is disposed for limited rotation in a plane adjacent and parallel to an outside wall of the retractor support, is spring-biased to urge the pawl with which it is engaged, out of locking engagement with the ratchet wheel. The driving gear of the inertial wheel engages a driving spur gear fixed to the shaft, so that substantially uniform withdrawal of the seat belt webbing, as occurs when the belt is withdrawn from the retractor for buckling about a passenger, merely turns the inertial wheel without having any effect on the retractor's locking mechanism. On the other hand, if the belting is suddenly and forcefully withdrawn beyond a preselected rate of acceleration, the resistance offered by the inertial wheel to sudden accelerating rotation, causes the driven gear to "climb up" or rotate about the driving gear and in so doing to carry with it the plate to which it is attached. This occurs at a rate of acceleration such that the resistance to rotation of the inertial wheel exceeds the spring bias holding the plate in its normally stationary position. As the plate carries an arm engaging a projecting extension of the pawl, the rotation of the plate about the driven gear urges the pawl into engagement with the ratchet wheel, thus preventing further pay-out of the safety belt.

Objects and attendant advantages of the present invention will be readily appreciated as the same becomes better understood by reference to the following detailed description, when considered in connection with the accompanying drawings.

BRIEF DESCRIPTION OF THE DRAWINGS

The description refers to the accompanying drawings in which like reference characters refer to like parts throughout the several views.

FIG. 1 is a perspective drawing of the preferred embodiment of the invention in which a vehicle seat belt retractor having a single inertial device responsive to two stimuli are shown.

FIG. 2 is an exploded view of the pertinent section of the preferred embodiment of the invention. The clutch components and the pawl, not visible in FIG. 1, are delineated.

FIG. 3 details two possible variations in perspective and cross section of the arm of FIGS. 1 and 2 for actuating the pawl.

DETAILED DESCRIPTION OF THE DRAWINGS

Referring simultaneously to the preferred retractor of FIG. 1, the exploded view of FIG. 2, and the detailed partial views of FIG. 3, numeral 1 is a wall extending from base 2 of the support. Shaft 3 adapted for the connection of a seat belt 4 to be wound thereon, extends through wall 1 and bushing 5. Bushing 5 which is one of two, each inserted in one of the two support walls, is preferably fabricated of nylon, Teflon, or similar polymeric material. Section 6 of shaft 3, preferably having a diameter less than that of the central portion of shaft 3, extends through opening 7 in rotatable plate 8, and terminates in driving spur gear 9 which is fixed thereon. This driving gear also serves to retain plate 8 adjacent to wall 1 and substantially in contact with the outer surface of the flange of bushing 5. Plate 8, having housing 11 preferably integrated therewith also has openings 12 into which the ends of spindle 13 are journaled for rotation. Spindle 13 carries pinion gear 14 fixed thereto and a cylindrical section 15 which is splined or has an off-round cross section for keyed engagement with opening 16 in clutch plate 17. The inertial wheel-clutch structure 18 is assembled by slipping inertial wheel 19 rotatably on splined section 15 of spindle 13 with recess 21 directed away from pinion gear 14. Coiled spring 22, preferably conical, is placed in recess 21. Clutch plate 17 is then forced on splined section 15 to compress spring 22, and for a keyed relationship with this splined section. While held in this state of compression, fastening member 23, here shown as an open spring retaining washer, is forced into groove 24 on the spindle to complete the assembly. Inertial wheel 19 now rotates together with pinion gear 14 because of its frictional engagement with clutch plate 17 which is keyed to the spindle. If spindle 13 with fixed pinion gear 14 is turned, inertial wheel 19 turns with it in this preferred embodiment, but if spindle 13 is turned while inertial wheel 19 is held stationary inertial wheel 19 slips with respect to rotating clutch plate 17 because of the frictional contact of both elements 17 and 19 with compressed spring 22. It would also be entirely workable to assemble the inertial wheel clutch structure 18 by first sliding clutch plate 17 along splined section 15 until in contact with the inner surface 25 of recess 21, then urging spring 22 over the splined section 15 to compress it, and while holding it thus in its compressed state, snapping spring retaining washer 23 into groove 24. Inner recessed surface 25 then presents a clutch surface against which clutch plate 17 is biased by coiled spring 22. Of course, many different types of resilient materials, such as a rubber or sponge rubber washer could be substituted for coiled spring 22 in this subassembly. This inertial wheel-clutch subassembly is snapped into housing 11 with the ends of the spindle journaled in openings 12. This is readily accomplished in the preferred embodiment shown, as the plate, housing and pawl-actuating arm 26 are preferably fabricated in one piece of nylon, Teflon or other similar polymeric material having the required degree of rigidity, yet also having sufficient flexibility to permit this method of assembly. The driven pinion gear 14 of the spindle is now positioned to engage driving gear 9.

In another embodiment the inertial wheel is fixed to the spindle and pinion gear, and does not contain a clutch. This variation will be discussed in connection with the free swinging pendulum sensor to follow.

Pawl 27 is inserted through opening 28 in wall 1, with pivot end 29 inserted into a wedge shaped opening in the opposite support wall. Projecting extension 31 of the pawl extends through opening 28 for actuation adjacent to the outside surface of support wall 1. The bifurcated terminus of the pawl-actuating arm 26 engages projection 31 of the pawl, and when plate 8 is rotated back and forth on shaft extension 6, it rocks the pivotable pawl in and out of locking engagement with ratchet wheel 32.

A circular or elongated closed opening can equally well be used as the terminus of pawl actuating arm 26 in place of the bifurcation, as detailed in FIG. 3, A, B and C.

FIG. 3A illustrates such a closed loop, which may employ an opening for projection 31 as in FIG. 3B, or a recess for this projection as shown in FIG. 3C.

The ratchet wheel 32 may be placed between the support walls adjacent to either one, or two ratchet wheels may be used, each being adjacent to an inner support wall, thus acting additionally as reel flanges for the seat belt webbing. Alternately, one ratchet wheel can be employed adjacent to the outer surface of support wall 1, being fixed to shaft 3 and disposed between the support wall and the plate. Preferably, it would rotate against the flange of bushing 5, and be separated from plate 8 by a washer to minimize any effect the rotation of the ratchet wheel would have on the rotatable plate 8. With such an arrangement, a pawl such as that shown, rotatable between the support walls, would not be necessary. A relatively short pawl, pivotally mounted in support wall 1 to engage the ratchet wheel would not only suffice, but would have the advantage of being light in weight and therefore very responsive to actuating arm 26.

Biasing spring 33 is attached to fixed pin 34. It may be attached for providing fixed tension by using an opening such as opening 35 in tabular extension 36 of movable plate 8. Preferably a device for adjusting the tension of the biasing-spring 33 is used. This may consist of a series of holes in tabular extension 36 arranged vertically, or it may consist of an easily adjustable device such as that shown in FIGS. 1 and 2. The end of biasing spring 33 is inserted in opening 37 of rotatable cylindrical member 38 which is slideable and rotatable in opening 35. This member has a head with extension 39. Preferably this head is adapted for receiving a tool such as a screw driver or small wrench.

In the embodiment shown, coil spring 41 is placed over cylindrical member 38, said member then being inserted in opening 35 against the bias of spring 41 until rod 42 can be inserted in opening 43 of the cylindrical member. A number of equispaced channels on the side of the tabulation adjacent to support wall 1, radiate from the center of opening 35, each channel having a corresponding in-line channel on the opposite side of opening 35. Spring 41 retains rod 42 in a pair of in-line channels, and thereby fixes the position of extension 39 and 37, and therefore the tension of biasing spring 33. If, however, a force is applied to head 39, as for example, by inserting a screw driver in slot 44, rod 42 will lift out of the channel in which it is lodged, and snap into another channel, thus increasing or decreasing the distance between opening 37 and fixed pin 34, and accordingly the tension applied by biasing spring 33 as desired. This tension is applied to the plate in a direction to rotate it and bifurcated arm 26 to its normally stationary position. In this position, the arm 26 in engagement with projection 31 of the pawl, retains the pawl out of engagement with ratchet wheel 32. Furthermore, the pawl is biased in this position by biasing spring 33, acting through arm 26.

With this arrangement, if the seat belt webbing is withdrawn uniformly as in buckling up or moving about in the seat, the rotation of the shaft will cause driving gear 9 to turn driven gear 14, and inertial wheel 19, without actuating the pawl. If, however, the webbing is rapidly accelerated as would occur if the wearer lurched forward as a result of a collision, the inertia of the inertial wheel would cause it to resist accelerated rotation sufficiently so that the driven gear 14 would "climb up" or rotate about driving gear 9. This would rotate movable plate 8 to which the driven gear 14 is rotatably attached, against its bias, and cause extending arm 26 to move projecting extension 31 of the pawl, hence pawl 27, into locking engagement with ratchet wheel 32, thereby preventing pay-out of the safety seat belt.

It will be noted that this particular response occurs whether the inertial wheel is fixed to the spindle or attached thereto by means of a clutch.

The following description is directed to the sensor responsive to acceleration or deceleration of the vehicle to which the retractor is attached, and to roll-over, if it is desired to adjust the sensor to include such response.

Pendulum support 45 is attached to support wall 1. In the embodiment shown, the support is fabricated of nylon, Teflon or other polymeric material and is attached to the support wall by screws 46 and projections 47. Platform 48 of the pendulum support has an opening 49 with a raised lip or collar 51. The pendulum comprises a button-shaped disc 52 preferably having a depression in its upper surface, 53. Beneath this button-shaped disc there extends perpendicularly, from a central point, pendulum shank 54 to which pendulum bob 55 is attached. The button-shaped disc normally rests on the surface of the platform over opening 49, or preferably on collar 51 parallel to platform 48, with shank 54 extending through opening 49. The opening, collar, and shank are fabricated to permit the pendulum to swing in any direction through an angle of about at least 40.

Lever 56 is attached to the pendulum support 45 by inserting hinge pin 57 through openings 58 in the lever, and opening 59 in the pendulum support. Nodule 62 protruding from the underside of the lever now rests in the depression in the upper surface of the button-shaped disc 52, or is disposed directly above it. If desired, to vary the degree of sensitivity, an adjusting screw is used, or the pendulum support is so shaped as to permit the lever to rest just above the button-shaped disc rather than directly on it.

The free end of the lever 56 does not normally touch the peripheral surface of inertial wheel 19, but is urged into such contact with the wheel when acceleration, deceleration or roll-over of the vehicle to which the retractor is attached, causes the pendulum to swing out of its normally vertical position. When this occurs, the button-shaped disc 52 rocks, raising lever 56 and causing the free end to contact the peripheral surface of inertial wheel 19. If the peripheral surface is smooth, milled, roughened, knurled, ribbed, or has a wavy texture, the rotary motion of the inertial wheel is inhibited. This action is analogous to the resistance of rotation that the inertial wheel offers when forced to accelerate rapidly. Thus, engagement of the lever with the wheel has substantially the same effect as is obtained upon rapid pay-out of the webbing. Because of inhibited rotation of the inertial wheel 19, the driven gear 14 attached thereto is urged to climb up or rotate about the driving gear 9 thereby rotating the movable plate 8 to which the driven gear is attached, and moving the actuating arm 26 to actuate the pawl 27 into locking engagement with ratchet wheel 32. The result is to prevent further extension of the safety belt.

Since the contact of the lever 56 with the types of peripheral surfaces mentioned, will permit slippage until the pawl 27 is fully locked with the ratchet wheel, no clutch is required. Such slippage between lever 56 and the inertial wheel, in fact, serves as a clutch.

In the preferred embodiment, however, the periphery of the inertial wheel is equipped with ratchet teeth 61 for engagement by lever 56, the free end of which is shaped for such engagement. In this embodiment, therefore, the lever 56 does more than inhibit rotation of the inertial wheel 19, it stops it positively and permits no further rotation of this wheel. For this reason, the ratchet teeth of the inertial wheel initiate the restraint of the belt. At this point any further extension of belt 4, however slight, causes the driven gear 14 which is now stationary in relation to the rotatable plate, to follow the rotation of the driving gear 9, and therefore do rotate the movable plate 8 and attached actuating arm 26 to urge the pawl 27 into locking engagement with the ratchet wheel. It should be noted that the motion of the belt need not be accelerating. Any motion produces the necessary locking action and it is not the weak effect of the pendulum that moves the ratchet bar, but the strong positive force of the belt on the shaft and driven gear. In a sense, the sensing pendulum serves as a relay, and it is the feed-back of the initial restraining action of the belt that brings about the positive action of the ratchet and pawl.

The initial restraint is brought about by the action of the lever on the ratchet teeth of the inertial wheel. The clutch 18 therefore becomes important in this preferred embodiment. Since normally the lever and inertial wheel would engage before the pawl and ratchet wheel, the clutch permits the restraining action to shift from the lightweight lever and inertial wheel to the heavy duty pawl and ratchet wheel, thus no significant strain is placed on the lever and inertial wheel as would be the case in the absence of the clutch.

The sensitivity of the pendulum sensor can be preselected in several different ways. By lightening the pendulum bob and shortening the shank on which it is suspended, the sensitivity to response is reduced. Raising the at-rest position of the lever slightly above the button-shaped disc has a similar effect. On the other hand, varying the tension on spring 33 in this instance has substantially no effect on the sensitivity of response. If the pendulum is to respond to roll-over, a relatively heavy pendulum bob is selected. If differentiation is desired between steep hills and roll-over, the lever can be adjusted, or the distance between lever and inertial wheel, so that response is obtained only when the angle is greater than would be encountered on the highway.

This invention has been described in an illustrative manner. It is to be understood that the terminology which has been used is intended to be in the nature of words of description rather than of limitation.

Many modifications or variations of the present invention are possible in the light of the above teachings. It is therefore to be understood that within the scope of the appended claims, the invention may be practiced otherwise than as specifically described.

I claim:

1. In a vehicle safety seat belt system the combination of a webbing retractor having a single inertial device responsive to two different stimuli to prevent pay-out of the safety belt webbing under emergency conditions, said combination comprising:
   a. a support having a base and two walls extending therefrom;
   b. a shaft journaled on the support adapted for connection to a seat belt, said shaft extending beyond the support wall;
   c. a biasing member connected to the support and to the shaft, urging it to rotate in its winding direction;
   d. a ratchet wheel fixed to the rotatable shaft;
   e. a pawl mounted pivotally on the support for engagement with the ratchet wheel, said pawl being movable between a normally unlocked position and a locked position for engagement with the ratchet to stop rotation of the shaft in its unwind direction;
   f. a normally stationary movable plate rotatable about the extending shaft for limited motion in a plane parallel to the outside surface of the support wall, said plate having an extension therefrom for urging the pawl into locking engagement with the ratchet wheel, said plate being biased to its normally stationary position;
   g. a driving gear fixed to the end of the extending shaft, adjacent to the outside surface of the movable plate;
   h. a driven gear concentrically fixed to a spindle, said spindle being perpendicular to the outer surface of the movable plate and rotatably supported thereon, said driven gear disposed to mesh with the driving gear;
   i. an inertial wheel rotatable on the spindle and concentrically attached to the driven gear, whereby accelerated rotation of the shaft and attached driving gear exceeding a preselected rate induces movement of the driven gear around the driving gear, with consequent movement of the plate attached thereto, in opposition to its bias, with the extension of the plate urging the pawl into locking engagement with the ratchet;
   j. a pendulum support fixed to a support wall, said pendulum support having an opening therein;
   k. a free swinging pendulum comprising a pivoting member having a dimension greater than that of the opening in the support, a pendulum bob, and a rigid interconnecting shank, said pivoting member being disposed above the opening, with the shank terminating in the pendulum bob extending therethrough;
   l. a lever pivotally mounted and disposed above the upper extension of the pendulum whereby movement of the pendulum will induce upward movement of the lever, urging it to contact and inhibit rotation of the inertial wheel, whereby rotation of the shaft and attached driving gear induces movement of the driven gear around the driving gear, moving the plate attached thereto in opposition to its bias, with the extension of the plate urging the pawl into locking engagement with the ratchet.

2. The combination of claim 1 wherein the attachment of the inertial wheel with the driven gear is a spring biased frictional attachment, in which the inertial wheel is adjacent to the driven gear on the spindle and rotatable thereon, and in frictional contact with a clutch plate slideably keyed to the spindle, and biased to the surface of the inertial wheel by a spring concentric to the spindle and retained thereon by a fastening member.

3. The combination of claim 1 wherein the attachment of the inertial wheel with the driven gear is a spring biased frictional attachment, in which the inertial wheel is adjacent to the driven gear on the spindle and rotatable thereon, said inertial wheel being recessed for receiving a spring concentrically disposed about the spindle and sandwiched between the inner surface of the recess and a clutch plate slideably keyed to the spindle, said clutch plate being retained on the spindle by a fastening member.

4. The combination of claim 1 wherein the inertial wheel has ratchet teeth on its periphery, disposed for locking engagement with the pivotally mounted lever.

5. The combination of claim 1 wherein the rotatable plate includes a rigid housing extending about the inertial wheel and its attached driven gear, said housing having parallel walls with opposing openings in each wall into which the spindle is journalled and supported.

6. The combination of claim 1 wherein the extension of the movable plate for urging the pawl into locking engagement with the ratchet wheel, is an arm terminating in a bifurcation, for biasing the extension of the pawl and the pawl of which it is a part, out of engagement with the ratchet wheel when the plate is in its normal stationary position and for urging the pawl into engagement with the ratchet wheel in response of the inertial device, to stimuli.

7. The combination of claim 1 wherein the ratio of the effective diameter of the driving gear to that of the driven gear lies within the range of 1.5:1 to 10.0:1.

8. The combination of claim 1 wherein the bias to the rotatable plate is supplied by a contraction spring fixed at one end to the support and at the other to the movable plate, to urge the extension thereto and the pawl with which the extension is in contact, out of engagement with the ratchet wheel.

9. The combination of claim 8 wherein there is provided adjustment means for varying the tension of the contraction spring.

10. The combination of claim 8 wherein the adjusting means comprises a tabular projection extending horizontally from the plate and substantially above the pawl, said tabular projection having a cylindrical opening perpendicular to the plate, said tabular projection also having a plurality of short equispaced channels in the surface of the side of the tabular projection facing the support wall, said channels radiating away from the axis of the cylindrical opening and each channel having a corresponding in-line channel on the opposite side of the cylindrical opening; a cylindrical member rotatable and slideable within the cylindrical opening, said cylindrical member having at the end away from the support wall an enlarged portion contoured for receiving a tool for inducing rotary motion to the cylindrical member, said enlarged portion also having a perforate perpendicularly disposed extension for securing the end of the biasing contraction spring, the end of the cylindrical member toward the support wall having a transverse opening for the introduction of a short rod for engaging any selected two in-line channels; a coiled compression spring disposed concentric to the cylindrical member between the enlarged portion of the cylindrical member and the tabular projection to thereby retain the short rod in engagement with any two in-line channels, whereby the application of force to rotate the enlarged portion of the cylindrical member changes the position of the perforate extension for the biasing contracting spring, to change its tension.

11. The combination of claim 1 wherein one ratchet wheel fixed to the shaft is disposed between the two support walls and adjacent to the wall, said inertial device being supported on the outside wall, and with the pawl extending pivotally between both walls for engagement with the ratchet wheel; said pawl having a projecting member extending through the support wall for engaging the extension of the rotatable plate, said rotatable plate normally biasing the pawl to its disengaged position with the ratchet.

12. The combination of claim 1 wherein the pendulum pivoting member is a button-shaped disc, perpendicular to the shank from which the pendulum bob depends, so that angular displacement of the pendulum rocks the pivoting member toward its periphery and raises the pivotally mounted lever above it, to contact the inertial wheel and inhibit rotary motion.

13. The combination of claim 12 in which the disc has a centrally located depression in its upper surface corresponding to the protruding nodule beneath the pivoting lever, and the opening in the pendulum support has a raised collar extending upwardly from the plate, with the disc resting on the circular edge of this collar rather than directly on the surface of the pendulum support, said opening and surrounding collar being sized to permit the pendulum to swing through an arc of at least about 40.

14. In a vehicle safety seat belt system, the combination of a webbing retractor having a single inertial device responsive to two different stimuli to prevent payout of the safety belt webbing under emergency conditions, said combination comprising:
a. a support having a base and two walls extending therefrom;
b. a shaft journaled on the support walls adapted for connection to a seat belt, said shaft extending beyond the support wall;
c. a biasing coiled spring connected to the support and to the shaft, urging the shaft to rotate in its winding direction;
d. at least one ratchet wheel fixed to the shaft and disposed between the two support walls, adjacent to the wall;
e. a pawl extending between both support walls for engagement with the ratchet wheel, said pawl being pivotable in the walls from a position of locking engagement with the ratchet wheel to a position of disengagement therewith, said pawl having additionally a projecting member extending through the support wall;
f. a normally stationary, movable plate rotatable about the extending shaft for limited motion in a plane parallel to the outside surface of the support wall, said plate having an arm extending therefrom for connection with the projecting member of the pawl, said movable plate being spring biased to its normally stationary position, with its extending arm biasing the pawl, with which it is in contact, into its disengaged position with the ratchet wheel;
g. a driving gear fixed to the end of the extending shaft adjacent to the outside surface of the movable plate;
h. a driven gear concentrically fixed to a spindle, said spindle being perpendicular to the outer surface of the movable plate and rotatably supported thereon, said driven gear disposed to mesh with the driving gear;
i. a clutch plate slideable longitudinally on the spindle and keyed thereto;
j. an inertial wheel rotatable on the spindle, said wheel having ratchet teeth on its periphery and having a circular concentric recessed clutch surface on its outer face;
k. a spring on the spindle with one end in the recess and compressed between the inertial wheel and the keyed clutch plate on the spindle, the components being retained under compression by means of a fastening member, at the end of the spindle opposite the driven gear;
l. a rigid housing about the inertial wheel and driven gear on the spindle, said housing extending from the movable plate and having an outer wall parallel to the surface of the movable plate with opposing openings, one opening in the plate and one in the outer parallel wall, into which openings the spindle is journaled and supported for rotation, whereby accelerated rotation of the shaft and attached driving gear exceeding a preselected rate, induces movement of the driven gear around the driving gear with consequent movement of the plate and extending arm attached thereto in opposition to the spring bias, with the arm urging the pawl into locking engagement with the ratchet wheel;
m. a pendulum support fixed to a support wall, said pendulum support having an opening therein;
n. a free swinging pendulum comprising a button-shaped disc as a pivoting member, having a diameter greater than that of the opening in the support, a rigid shank perpendicular to the disc, extending downwardly therefrom through the opening in the pendulum support to terminate in a pendulum bob;

o. a lever, pivotally mounted, disposed above the button-shaped disc in a normally stationary position; said lever being contoured for engaging the ratchet teeth of the inertial wheel when moved upwardly from its normally disengaged position, whereby movement of the pendulum will rock the button-shaped disc and lift the lever for engagement of the inertial wheel, whereupon minimal extension of the webbing will induce movement of the driven gear around the driving gear with consequent movement of the plate attached thereto, in opposition to its bias, with the arm extending from the plate urging the pawl into locking engagement with the ratchet wheel.

15. In a vehicle safety belt retractor having a shaft and belt webbing wound upon said shaft, wherein said retractor normally permits payout of the belt webbing and prevents payout of the webbing under emergency conditions, the improvement comprising: a webbing-sensitive locking mechanism mounted on the retractor, responsive to withdrawal of the webbing at a pre-selected high rate of acceleration, and an independently mounted vehicle sensitive sensor which, in response to rapid acceleration or deceleration of the vehicle to which the retractor is attached, places said webbing sensitive locking mechanism in condition for actuation into locking engagement to prevent any further extension of the webbing; said webbing sensitive locking mechanism including: a plate, means mounting said plate on said retractor for movement between a stationary position and an actuated position, means biasing said plate to its normally stationary position, a driving member rotatably mounted on said shaft adjacent to said plate, a driven member, means for rotatably mounting said driven member on said plate, said driven member engaging said driving member, and an inertia wheel, means for rotatably mounting said inertia wheel on said plate, whereby acceleration in the payout of said webbing causes acceleration in rotation of said shaft and attached driving gear and induces movement of the driven member around the driving member, as a result of engagement between said driven member and said driving member, said movement of said driven member causing movement of the plate in opposition to its bias which actuates said locking mechanism to prevent further payout of the webbing; said vehicle sensitive sensor including a pendulum and a lever movably mounted adjacent to said pendulum and said inertia wheel, whereby movement of said pendulum will induce movement of said lever, urging said lever into contact with said inertia wheel, thereby preventing further rotation of said inertia wheel, said vehicle sensitive sensor thereby placing said webbing sensitive locking mechanism in condition for actuation, said inertia wheel thereby being responsive to two different stimuli to prevent payout of the webbing under emergency conditions.

16. In a vehicle safety belt retractor having a shaft and belt webbing wound upon said shaft, wherein said retractor normally permits payout of the webbing and prevents payout of the webbing under emergency conditions, the improvement comprising: a webbing-sensitive locking mechanism mounted on the retractor, responsive to withdrawal of the webbing at a pre-selected high rate of acceleration, and an independently mounted vehicle sensitive sensor which, in response to rapid acceleration or deceleration of the vehicle to which the retractor is attached, places said webbing sensitive locking mechanism in condition for actuation into locking engagement to prevent any further extension of the webbing; said webbing sensitive locking mechanism including: a movable means, means mounting said movable means on said retractor for movement between a stationary position and an actuated position, means biasing said movable means to its normally stationary position; an inertia wheel, means for rotatably mounting said inertia wheel on said movable means; gear means coupled to said shaft and to said movable means, said movable means responding to motion of said gear means, whereby acceleration in the payout of said webbing causes acceleration in rotation of said shaft and induces movement of the gear means as a result of said coupling between said gear means and said shaft, causing movement of the movable means to its actuated position in opposition to its bias, as a result of said coupling between said gear means and said movable means, said movable means actuating said locking mechanism to prevent further payout of the webbing; said vehicle sensitive sensor including a pendulum means for locking said inertia wheel, preventing further rotation of said inertia wheel; said vehicle sensitive sensor thereby placing said webbing sensitive locking mechanism in condition for actuation, said inertia wheel thereby being responsive to two different stimuli to prevent payout of the webbing under emergency conditions.

* * * * *

UNITED STATES PATENT AND TRADEMARK OFFICE
CERTIFICATE OF CORRECTION

PATENT NO. : 3,918,658
DATED : November 11, 1975
INVENTOR(S) : Herbert R. Beller It is certified that error appears in the above-identified patent and that said Letters Patent are hereby corrected as shown below:

Column 6, line 2: after "40" insert --°--

Column 9, line 61: after "40" insert --°--

Signed and Sealed this

Twenty-first Day of September 1976

[SEAL]

Attest:

RUTH C. MASON
Attesting Officer

C. MARSHALL DANN
Commissioner of Patents and Trademarks